F. E. SCHARTOW.
SNAP HOOK.
APPLICATION FILED DEC. 19, 1913.
1,257,641.
Patented Feb. 26, 1918.
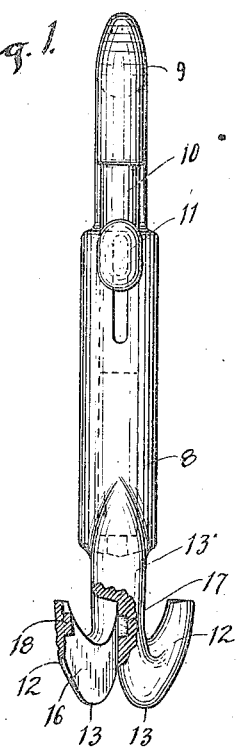
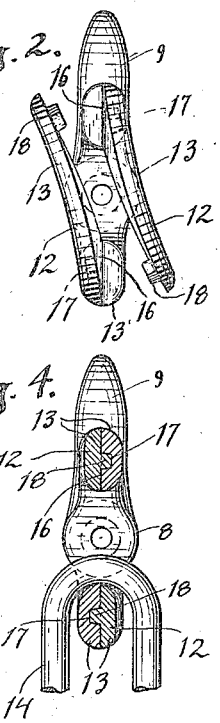
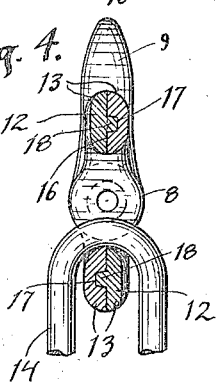
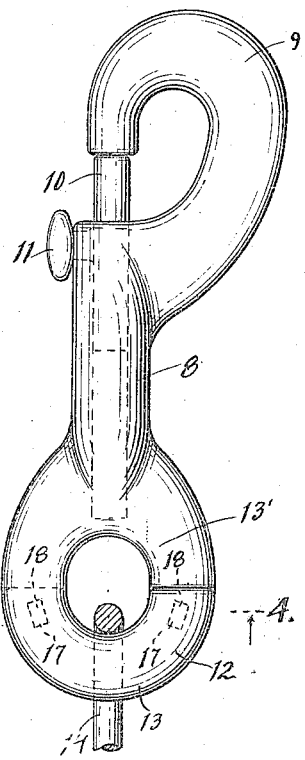
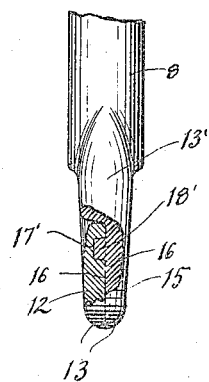
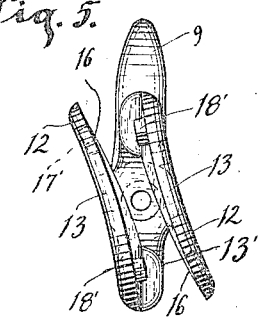
WITNESSES.
C. F. Miller.
Katherine Holt
INVENTOR
Frank E. Schartow,
By Morsell & Caldwell
ATTORNEYS.

UNITED STATES PATENT OFFICE.

FRANK E. SCHARTOW, OF RACINE, WISCONSIN, ASSIGNOR OF ONE-HALF TO RUPERT A. NOURSE, OF MILWAUKEE, WISCONSIN.

SNAP-HOOK.

1,257,641.      Specification of Letters Patent.      Patented Feb. 26, 1918.

Application filed December 19, 1913. Serial No. 807,624.

*To all whom it may concern:*

Be it known that I, FRANK E. SCHARTOW, a citizen of the United States, and resident of Racine, in the county of Racine and State of Wisconsin, have invented new and useful Improvements in Snap-Hooks, of which the following is a description, reference being had to the accompanying drawings, which are a part of this specification.

This invention relates to improvements in snap hooks and more particularly to snap hooks formed of cast metal and in which the eye is cast in open position and is closed when attached to a chain link or other connection.

In snap hooks of the type mentioned the eye is usually cast in hook form with the end of the hook spaced a sufficient distance from the body portion to permit a chain link or other connection to be engaged by the hook. The hook is then closed so that the end of the hook abuts against the body portion and closes the eye. The eyes of snap hooks formed in this manner tend to open and straighten out when subjected to unusual strains and do not possess sufficient strength to withstand strains which they are ordinarily subjected to.

It is one of the objects of the present invention to overcome the before mentioned objectionable features and provide a snap hook which may be cast with an open eye, and which, when closed, possesses sufficient strength to withstand all strains which they may ordinarily be subjected to.

A further object of the invention is to provide a snap hook in which the eyed portion thereof is formed of two thicknesses of metal so constructed that even though the parts would give or partially straighten out while under abnormal strain, the eye would still remain closed.

A further object of the invention is to provide a snap hook in which means are provided for locking the eyed portions together when in closed position.

A further object of the invention is to provide a snap hook of simple construction which is strong and durable, is inexpensive to manufacture and is well adapted for the purpose described.

With the above and other objects in view, the invention consists of the improved snap hook and its parts and combinations as set forth in the claim, and all equivalents thereof.

In the accompanying drawing in which the same reference characters indicate the same parts in all of the views:

Figure 1 is a front view of the improved snap hook, parts being in section to show interior construction;

Fig. 2 is an inverted end view thereof;

Fig. 3 is a side view of the snap hook with portions forming the eye shown in closed position, the view also showing fragments of a chain link engaging the eye;

Fig. 4 is a transverse sectional view thereof taken on line 4—4 of Fig. 3;

Fig. 5 is an inverted top view of a modified form of snap hook; and

Fig. 6 is a front view of the lower portion of the modified form with portions in section to show interior construction.

Referring to the drawing the numeral 8 indicates the shank, 9 the hook member and 10 the spring actuated bolt thereof having the operating knob 11 projecting therefrom. The lower end of the shank portion of the snap hook is provided with two depending hook like parts 12, the lower half circular tongue portions 13 of which side lap each other and are cast in spaced relation to permit a chain link or other connection 14 to be attached thereto. These hook like portions when pressed together form the improved eye 15 of the snap hook.

The overlapped lower half circular tongues 13 of the eye are each approximately one-half the transverse thickness of the upper half circular part 13' and the inner faces 16 of the side-lapped tongues are of flat form so that when the parts are pressed together the lower portion of the eye will be approximately flush with the upper portion and thus preserve the symmetrical contour of the eye of the hook.

In order to lock the overlapped tongues 13 of the eye together the upper inner part of each hook like tongue adjacent to its junction with the upper portion of the eye is provided with a locking recess 17 into which extends the locking projection 18 formed on the inner face of each free end of the hook like tongues. These projections extend at right angles from the said tongues and prevent the tongues from straightening out under a pulling strain.

In the modified form shown in Figs. 5 and 6 the locking recesses 17′ are provided in the free end portions of the tongues and the projections 18′ extend from the upper inner faces of the portions of the tongues adjacent to their junction with the upper part of the eye. The snap hooks are usually formed of metal possessing sufficient malleability to permit the parts being bent without breaking.

From the foregoing description it will be seen that the eye of the snap hook may be cast in convenient form to attach a chain link or any other connection thereto and when attached the eye portions may be closed into locked position, and in which position the tongue portion of the snap hook will be substantially as strong as if all parts of the eye were formed integral.

What I claim as my invention is:

A snap hook comprising in part a shank portion provided on one end with an integral half circular portion and with half circular side lapped bendable tongues, each of said tongues being approximately one half the thickness of the half circular portion and forming a continuation from opposite ends thereof, the inner faces of said tongues being flat and bearing against each other and each tongue having a projection near one end and a recess adjacent its junction with the half circular portion to engage with a similar recess and projection on the other tongue to lock said tongues together, said tongues being spaced from each other until brought together to form an eye with the integral half circular portion.

In testimony whereof, I affix my signature, in presence of two witneses.

FRANK E. SCHARTOW.

Witnesses:
E. G. H. WENDT,
L. P. HANSEN.

Copies of this patent may be obtained for five cents each, by addressing the "Commissioner of Patents, Washington, D. C."